United States Patent
Chen et al.

(10) Patent No.: US 10,889,501 B2
(45) Date of Patent: Jan. 12, 2021

(54) SOLAR THERMAL AEROGEL RECEIVER AND MATERIALS THEREFOR

(71) Applicant: Massachusetts Institute of Technology, Cambridge, MA (US)

(72) Inventors: Gang Chen, Carlisle, MA (US); Evelyn N. Wang, Cambridge, MA (US); Svetlana Boriskina, Winchester, MA (US); Lee A. Weinstein, Somerville, MA (US); Sungwoo Yang, Chattanooga, TN (US); Bikramjit S. Bhatia, Cambridge, MA (US); Lin Zhao, Revere, MA (US); Elise M. Strobach, Clear Lake, WI (US); Thomas A. Cooper, Boston, MA (US); David M. Bierman, Cambridge, MA (US); Xiaopeng Huang, Mountain View, CA (US); James Loomis, Valparaiso, FL (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/079,172

(22) PCT Filed: Feb. 24, 2017

(86) PCT No.: PCT/US2017/019415
§ 371 (c)(1),
(2) Date: Aug. 23, 2018

(87) PCT Pub. No.: WO2017/147463
PCT Pub. Date: Aug. 31, 2017

(65) Prior Publication Data
US 2019/0100439 A1    Apr. 4, 2019

Related U.S. Application Data

(60) Provisional application No. 62/299,090, filed on Feb. 24, 2016.

(51) Int. Cl.
*C01B 33/158* (2006.01)
*B01J 13/00* (2006.01)
(Continued)

(52) U.S. Cl.
CPC ....... *C01B 33/1585* (2013.01); *B01J 13/0091* (2013.01); *C01B 33/14* (2013.01);
(Continued)

(58) Field of Classification Search
CPC ... C01B 33/1585; C01B 33/14; C04B 14/064; F24S 80/65; F24S 20/20; F24S 70/20;
(Continued)

(56) References Cited

U.S. PATENT DOCUMENTS

| 4,810,863 A | 3/1989 | Kachi et al. |
| 6,492,014 B1 | 12/2002 | Rolison et al. |

(Continued)

FOREIGN PATENT DOCUMENTS

| CN | 201416371 Y | 3/2010 |
| CN | 201835403 U | 5/2011 |

(Continued)

OTHER PUBLICATIONS

Buratti et al., "Experimental Performance Evaluation of Aerogel Glazing Systems," Applied Energy, vol. 97, (2015), pp. 430-437.
(Continued)

*Primary Examiner* — Alfred Basichas
(74) *Attorney, Agent, or Firm* — Goodwin Procter LLP

(57) ABSTRACT

A silica aerogel having a mean pore size less than 5 nm with a standard deviation of 3 nm. The silica aerogel may have greater than 95% solar-weighted transmittance at a thickness of 8 mm for wavelengths in the range of 250 nm to 2500 nm, and a 400° C. black-body weighted specific extinction coefficient of greater than 8 m²/kg for wavelengths of 1.5 μm to 15 μm. Silica aerogel synthesis methods are described. A (Continued)

solar thermal aerogel receiver (STAR) may include an opaque frame defining an opening, an aerogel layer disposed in the opaque frame, with at least a portion of the aerogel layer being proximate the opening, and a heat transfer fluid pipe in thermal contact with and proximate the aerogel layer. A concentrating solar energy system may include a STAR and at least one reflector to direct sunlight to an opening in the STAR.

26 Claims, 13 Drawing Sheets

(51) Int. Cl.
| | |
|---|---|
| F24S 80/65 | (2018.01) |
| F24S 80/56 | (2018.01) |
| F24S 20/20 | (2018.01) |
| C04B 14/06 | (2006.01) |
| C01B 33/14 | (2006.01) |
| F24S 70/20 | (2018.01) |
| F24S 10/95 | (2018.01) |
| F24S 23/70 | (2018.01) |

(52) U.S. Cl.
CPC ............ *C04B 14/064* (2013.01); *F24S 10/95* (2018.05); *F24S 20/20* (2018.05); *F24S 23/70* (2018.05); *F24S 70/20* (2018.05); *F24S 80/56* (2018.05); *F24S 80/65* (2018.05); *C01P 2004/64* (2013.01); *C01P 2006/16* (2013.01); *C01P 2006/32* (2013.01); *F24S 2023/872* (2018.05); *Y02E 10/40* (2013.01)

(58) Field of Classification Search
CPC .. F24S 10/95; F24S 23/70; F24S 80/56; F24S 2023/872; B01J 13/0091; C01P 2004/64; C01P 2006/16; C01P 2006/32; Y02E 10/40
See application file for complete search history.

(56) References Cited

U.S. PATENT DOCUMENTS

| | | | |
|---|---|---|---|
| 9,022,020 B2* | 5/2015 | Mills | ............... H01L 31/054 126/572 |
| 9,102,076 B2 | 8/2015 | Doshi et al. | |
| 2006/0059852 A1 | 3/2006 | Toas et al. | |
| 2008/0229704 A1 | 9/2008 | Augustyniak et al. | |
| 2009/0029147 A1 | 1/2009 | Tang et al. | |
| 2010/0186333 A1 | 7/2010 | Miller | |
| 2011/0120031 A1 | 5/2011 | Scherba | |
| 2012/0279492 A1* | 11/2012 | Spinelli | ............... F16L 11/22 126/663 |
| 2013/0106008 A1 | 5/2013 | Ahn et al. | |
| 2014/0065329 A1 | 3/2014 | Showers | |
| 2015/0053266 A1 | 2/2015 | Chen et al. | |
| 2017/0010023 A1 | 1/2017 | Slocum et al. | |
| 2017/0022106 A1 | 1/2017 | Buttner et al. | |
| 2017/0022345 A1 | 1/2017 | Dufour et al. | |
| 2017/0022703 A1 | 1/2017 | Buttner et al. | |
| 2018/0093456 A1 | 4/2018 | Van Overmeere et al. | |

FOREIGN PATENT DOCUMENTS

| | | |
|---|---|---|
| CN | 201883601 U | 6/2011 |
| CN | 202000514 U | 10/2011 |
| CN | 202000548 U | 10/2011 |
| CN | 102536061 A | 7/2012 |
| CN | 202430882 U | 9/2012 |
| CN | 202467537 U | 10/2012 |
| CN | 104556969 A | 4/2015 |
| CN | 104762007 A | 7/2015 |
| CN | 104946058 A | 9/2015 |
| CN | 205117129 U | 3/2016 |
| CN | 105565843 A | 5/2016 |
| CN | 105566583 A | 5/2016 |
| CN | 205736249 U | 11/2016 |
| CN | 106747562 A | 5/2017 |
| CN | 107416848 A | 12/2017 |
| DE | 4201306 A1 | 7/1993 |
| EP | 0884376 | 12/1998 |
| EP | 1033354 A1 | 9/2000 |
| EP | 2522927 | 11/2012 |
| EP | 2927194 | 10/2015 |
| GB | 2481693 A | 1/2012 |
| GB | 2488374 A | 8/2012 |
| GB | 2506430 A | 4/2014 |
| JP | H08187817 A | 7/1996 |
| JP | H1130085 A | 2/1999 |
| JP | H11333982 A | 12/1999 |
| JP | 2004183330 A | 7/2004 |
| JP | 2008045013 A | 2/2008 |
| JP | 2012140767 A | 7/2012 |
| JP | 2017039845 A | 2/2017 |
| WO | WO-1992020623 A1 | 11/1992 |
| WO | WO-2005110919 A1 | 11/2005 |
| WO | WO-2008110818 A1 | 9/2008 |
| WO | WO-2009094280 A2 | 7/2009 |
| WO | WO-2011120031 A2 | 9/2011 |
| WO | WO-2014090790 A1 | 6/2014 |
| WO | WO-2014199279 A1 | 12/2014 |
| WO | WO-2015151371 A1 | 10/2015 |
| WO | WO-2016203260 A1 | 12/2016 |
| WO | WO-2017090686 A1 | 6/2017 |
| WO | WO-2017147463 A1 | 8/2017 |
| WO | WO-2017185009 A1 | 10/2017 |

OTHER PUBLICATIONS

International Search Report and Written Opinion, PCT/US2019/029105, dated Sep. 18, 2019, 16 pages.
U.S. Department of Energy, Concentrating Solar Power Commercial Application Study: Reducing Water Consumption of Concentrating Solar Power electricity Generation, Report to Congress, (2008). pp. 35.
Heinemann, et al., "Radiation-conduction interaction: an investigation on silica aerogels," International Journal of Heat and Mass Transfer, vol. 39, No. 10, (1996), pp. 2115-2130.
Reda, et al., "Solar Position Algorithm for Solar Radiation Applications," Technical Report, NREL/TP-560-34302 (2003), Colorado, pp. 40.
"Aerogel insulation for buildings," accessed Oct. 22, 2018 at https://www.designingbuildings.co.uk/wiki/Aerogel_insulation_for_buildings, 4 pages.
Berardi, "Development of Glazing systems with silica aerogel," Energy Procedia, vol. 78 (2015) pp. 394-399.
Case, "Better windows with aerogels," Chemistry World, (2016) at http://www.chemistryworld.com/news/better-windows-with-aerogels/1010158.article, 3 pages.
Cohen, "Thermal properties of advanced aerogel insulation," Thesis (S.M.)—Massachusetts Institute of Technology, (2011), 79 pages.
Dhalla, Investigating Thermal Bridging in Window Systems Insulated with Monolithic Silica Aerogel. Bachelor of Mechanical Engineering, A MRP presented to Ryerson University, (2015), 87 pages.
Dillon, "Inexpensive Aerogel Panes for Window Retrofit for ARPA-E Shield Project," http://www.cleantechnotes.org/category/clean-energy-technologies/ Clean Energy Technologies, Posted on Fraunhofer CSE Website. 2 pages.
Dorcheh, et al., Silica aerogel; synthesis, properties and characterization, Journal of Materials Processing Technology, vol. 199, Issues 1-3, Apr. 1, 2008, pp. 10-26.
Dowson, "Novel Retrofit Technologies Incorporating Silica Aerogel for Lower Energy Buildings," Brunel University, School of Engineering and Design, Sep. 2012, 314 pages.
Ganobjak, et al., "Possibilities of Aerogels Application for Architectural Heritage Conservation," CISBAT (2015), pp. 51-56.

(56) References Cited

OTHER PUBLICATIONS

Gao, et al., "Perspective of aerogel glazings in energy efficient buildings," Building and Environment, vol. 95, (2016), pp. 405-413.
Garnier, et al., "Super insulated aerogel windows: Impact on daylighting and thermal performance," accessed Oct. 22, 2018 at https://www.infona.pl/resource/bwmeta1.element.elsevier-40498eb7-4f4f-3990-bef4-8d5e68ebc1b0, 2 pages.
Hermann, et al., "Retrofit measures for historic buildings and cities," This article originally appeared in Context 142, published by the Institute of Historic Building Conservation in Nov. 2015, pp. 29-31.
Hunt, Light Scattering Studies of Silica Aerogels, Published 2010, Lawrence Berkeley National Laboratory, 16 pages.
Ibrahim, et al., "Performance evaluation of buildings with advanced thermal insulation systems: A numerical study," Journal of Facade Design and Engineering 4 (2016), pp. 19-34.
Lamonica, "High-tech aerogels wrap homes with insulation," accessed at https://www.cnet.com/news/high-tech-aerogels-wrap-homes-with-insulation/, (2010), 4 pages.
Licholai, et al., "Possibilities of the Aerogel Application in Building," Lviv Polytechnic National University Institutional Repository, Hyperlink "http://ena.lp.edu.ua" http://ena.lp.edu.ua, (2013), 5 pages.
McEnaney et al., "Thermoelectrics and aerogels for solar energy conversion systems," download on Feb. 22, 2017, https://dspace.mit.edu/handel/1721.1/97770, 3 pages.
Nordgaard et al., "Modelling of Flat-Plate Collectors Based on Monolithic Silica Aerogel," Solar Energy, vol. 49, Issue 5, Nov. 1992, pp. 387-402.
Nusca, Super-insulating aerogels promise to make homes more energy-efficient, accessed Oct. 23, 2018, https://www.zdnet.com/article/super-insulating-aerogels-promise-to-make-homes-more-energy-efficient/, 5 pages.
Pan, et al., "A fast synthesis of silica aerogel powders—based on water glass via ambient drying," "https://link.springer.com/journal/10971" \o "Journal of Sol-Gel Science and Technology" Journal of Sol-Gel Science and Technology, (2017), vol. 82, Issue 2, pp. 594-601.
Schultz, et al., "Super insulating aerogel glazing," Solar Energy Materials & Solar Cells, vol. 89, (2005), pp. 275-285.
Shukla, et al., "Aerogel for Thermal Insulation of Interior Wall Retrofits in Cold Climates," In: Buildings Enclosure Science & Technology (BEST3) Conference, Atlanta, GA: BEST, (2012) pp. 1-12, Available at: https://c.ymcdn.com/sites/www.nibs.org/resource/resmgr/BEST/best3_shukla.2.11.pdf.
Svendsen, "Solar collector with monolithic silica aerogel," Journal of Non-Crystalline Solids, vol. 145, Dec. 1992, pp. 240-243.
Tamon et al., "Control of Mesoporous Structure of Silica Aerogel Prepared from TMOS," Journal of Colloid and Interface Science, vol. 188, Issue 1, Apr. 1, 1997, pp. 162-167.
Weinstein et al., "Concentrating Solar Power," Chemical Review, vol. 115, Oct. 2015, pp. 12797-12838.
Written Opinion for PCT/US2017/019415, dated Aug. 14, 2017, (10 pages).
Zhang, et al., "Synthesis, Structural and Thermal Properties of Nano-porous $SiO_2$-based Aerogels," Advances in Nanocomposites—Synthesis, Characterization and Industrial Applications, (2011), pp. 39-60.

\* cited by examiner

SOLAR THERMAL AEROGEL RECEIVER AND MATERIALS THEREFOR

CROSS-REFERENCE TO RELATED APPLICATIONS

This application is the national stage of International (PCT) Patent Application No. PCT/US2017/019415, entitled "Low Cost Parabolic Cylindrical Trough for Concentrated Solar Power" and filed on Feb. 24, 2017, which claims priority to and the benefit of U.S. Provisional Patent Application No. 62/299,090, entitled "Solar Thermal Aerogel Receiver (Star)" and filed on Feb. 24, 2016, each of which is hereby incorporated by reference herein in its entirety.

GOVERNMENT LICENSE RIGHTS

This invention was made with Government support under Grant No. DE-AR0000471 awarded by the Department of Energy. The Government has certain rights in the invention.

FIELD OF THE INVENTION

In general, embodiments of the present invention relate to silica aerogel materials and methods of fabrication, solar thermal aerogel receivers, and solar energy systems.

BACKGROUND

Currently available solar energy systems, such as parabolic trough collectors (PTCs), suffer from high cost per unit of exergy. Moreover, commercially available aerogels do not have the material properties necessary for use in a high-efficiency solar thermal receiver for use with e.g., flat reflectors. For example, currently available aerogels are typically not suitable for use at the high operating temperatures that facilitate efficiency.

SUMMARY

In accordance with embodiments of the invention, a high-performance air-stable solar thermal receiver includes a hot thermal absorber insulated by an optically transparent thermal insulator, referred to herein as the solar thermal aerogel receiver (STAR). The innovative stack includes a monolithic aerogel layer that is optically transparent and thermally insulating (OTTI) and a black absorber in which the working fluid may be heated. The receiver may have the ability to achieve maximum solar-to-exergy conversion efficiencies of >37% at an optical concentration of 40 suns, providing thermal energy from the thermal absorber, at a reduced total system cost per unit exergy of <$1/Wx, and an estimated lifetime of >25 years.

The technology described herein, including the optically transparent and thermally insulating aerogels, may be useful for concentrating solar power (CSP), as well as solar heating and cooling applications. CSP is an especially promising technology for solar thermal conversion. (Weinstein, L. A., et al., Chem. Rev. 2015, 115, 12797-12838).

In an aspect, embodiments of the invention relate to an aerogel material including silica aerogel defining a porous material with pores having a mean radius of less than 5 nm with a standard deviation of 3 nm.

One or more of the following features may be included. The aerogel material may include percent solids of less than 10%. The aerogel material may include a mean particle size of 1.3 nm. The silica aerogel may have a solar absorptance of >0.9 and IR emittance of <0.3 when in thermal contact with a black absorber at a temperature of 400° C.

The description of elements of the embodiments of other aspects of the invention may be applied to this aspect of the invention as well.

In another aspect, embodiments of the invention relate to an aerogel material including silica aerogel having (i) greater than 95% solar-weighted transmittance at a thickness of 8 mm for wavelengths selected from the range of 250 nm to 2500 nm; and (ii) a 400° C. black-body weighted specific extinction coefficient of greater than 8 m$^2$/kg for wavelengths selected from the range of 1.5 µm to 15 µm.

One or more of the following features may be included. The silica aerogel may have a thermal conductivity of less than 0.025 W/mK at room temperature and less than 0.1 W/mK at 400° C.

The description of elements of the embodiments of other aspects of the invention may be applied to this aspect of the invention as well.

In another aspect, embodiments of the invention relate to a method for forming a silica aerogel. The method may include the steps of diluting tetramethyl orthosilicate (TMOS) by methanol to create a TMOS solution; and adding an ammonia solution comprising ammonia and water to the TMOS solution to form a silica aerogel precursor. The molar ratio of ammonia to TMOS may be less than 0.0025.

One or more of the following features may be included. The method may further include allowing the silica aerogel precursor to gel, thereby forming the silica aerogel. The method may further include annealing the silica aerogel to reduce the size of pores in the silica aerogel. The pores may have a mean radius of less than 5 nm with a standard deviation of 3 nm. This pore size may be attained either before or after annealing.

The method may further include increasing the spectral selectivity of the aerogel insulation layer may by doping the silica aerogel with nanoparticles, such as tin oxide, indium tin oxide, carbon etc., that have strong absorption in the mid-infrared range.

The description of elements of the embodiments of other aspects of the invention may be applied to this aspect of the invention as well.

In another aspect, embodiments of the invention relate to a solar thermal aerogel receiver which may include (i) an opaque frame defining an opening; (ii) an aerogel layer disposed in the opaque frame, with at least a portion of the aerogel layer being disposed proximate the opening; and (iii) a heat transfer fluid pipe in thermal contact with and proximate the aerogel layer.

One or more of the following features may be included. The aerogel layer may include silica aerogel. The silica aerogel may define a porous material with pores having a mean radius of less than 5 nm with a standard deviation of 3 nm. The aerogel layer may include an absorber layer. The aerogel layer may include silica aerogel having (i) greater than 95% solar-weighted transmittance at a thickness of 8 mm for wavelengths selected from the range of 250 nm to 2500 nm; and (ii) a 400° C. black-body weighted specific extinction coefficient of greater than 8 m$^2$/kg for wavelengths selected from the range of 1.5 µm to 15 µm.

The heat transfer fluid pipe may include a black absorber layer.

The solar thermal aerogel receiver may further include a transparent outer layer disposed in the opening in the opaque frame. The transparent outer layer may include at least one of glass and a transparent polymer. The transparent outer layer may form at least a portion of a flat bottom surface of the opaque frame. The aerogel layer may be in direct contact with the transparent outer layer. The transparent outer layer and the aerogel layer may define an air gap therebetween. The opaque frame may further include an insulating layer.

The receiver may have a maximum solar-to-exergy conversion efficiency of greater than 35% at an optical concentration of 40 suns.

The description of elements of the embodiments of other aspects of the invention may be applied to this aspect of the invention as well.

In another aspect, embodiments of the invention relate to a concentrating solar energy system including a solar thermal aerogel receiver and at least one reflector configured to direct sunlight to the opening. The solar thermal aerogel receiver may include an opaque frame defining an opening, an aerogel layer disposed in the opaque frame, with at least a portion of the aerogel layer being disposed proximate the opening, and a heat transfer fluid pipe in thermal contact with and proximate to the aerogel layer.

One or more of the following features may be included. The aerogel layer may include an absorber layer. The aerogel layer may include silica aerogel. The silica aerogel may define a porous material with pores having a mean radius of less than 5 nm with a standard deviation of 3 nm. The aerogel layer may include silica aerogel having (i) greater than 95% solar-weighted transmittance at a thickness of 8 mm for wavelengths selected from the range of 250 nm to 2500 nm; and (ii) a 400° C. black-body weighted specific extinction coefficient of greater than 8 m$^2$/kg for wavelengths selected from the range of 1.5 μm to 15 μm.

The heat transfer fluid pipe may include a black absorber layer. The opaque frame may further include an insulating layer. The solar thermal aerogel receiver may have a maximum solar-to-exergy conversion efficiency of greater than 35% at an optical concentration of 40 suns.

The concentrating solar energy system may further include a transparent outer layer disposed in the opening. The transparent outer layer may include at least one of glass and a transparent polymer. The aerogel layer is in direct contact with the transparent outer layer. The transparent outer layer and the aerogel layer may define an air gap therebetween.

The transparent outer layer may form at least a portion of a flat bottom surface of the opaque frame. The description of elements of the embodiments of other aspects of the invention may be applied to this aspect of the invention as well.

BRIEF DESCRIPTION OF THE DRAWINGS

In the drawings, like reference characters generally refer to the same parts throughout different views. Also, the drawings are not necessarily to scale, emphasis instead generally being placed upon illustrating the principles of the invention. In the following description, various embodiments of the invention are described with reference to the following drawings, in which.

DETAILED DESCRIPTION

Figure 1A:
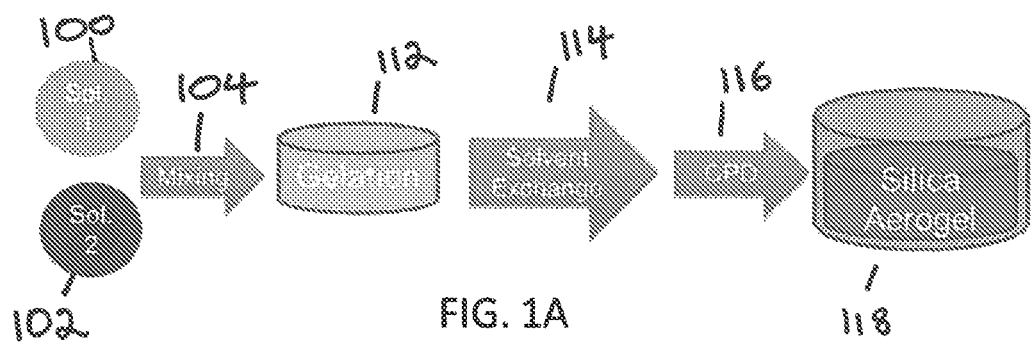
FIG. 1A is a flow chart of a sol-gel process in accordance with an embodiment of the invention.

The STAR configuration provides high receiver efficiency at low cost. The performance enhancement may be achieved through the reduction of thermal losses due to aerogel properties and receiver design. Cost reduction may be at least partially attributed to the STAR being well suited for use with linear Fresnel reflector (LFR) concentrating optics, which may be significantly cheaper than the commonly used parabolic trough concentrators (PTC). The STAR receiver may include air stable absorber coatings/aerogels that further eliminate the cost and complexity of a vacuum-evacuated receiver, which is the industry standard. The inclusion of air-stable absorber coatings/aerogels also enables operation at higher temperatures (up to 600° C.), which further increases receiver efficiency.

Silica Aerogel Properties

In some embodiments of the invention, a silica aerogel is synthesized with improved material properties, allowing the silica aerogel to, e.g., enhance the performance of the STAR. Silica aerogels have a spectral selectivity that allows solar radiation to pass through the bulk yet trap infrared (IR) radiation. In this way, silica aerogels may be both optically transparent and thermally insulating.

Generally, the thermal insulation characteristics of aerogels effectively reduce the outer surface temperature, reducing the overall heat loss in the STAR compared to the overall heat loss in vacuum-gap receivers. Silica aerogels may increase receiver efficiency and reduced concentration requirements. Aerogels are transmissive at most solar wavelengths because there are no absorption modes for silica at these wavelengths. However, Rayleigh scattering, which is a function of aerogel pore size, reduces the transmission for short wavelengths. By varying the pH during the aerogel synthesis process, and/or varying the drying time during the drying process, the pore size and Rayleigh scattering may be controlled. Although silica aerogels are naturally strongly absorbing from 5-30 μm, absorption from 3-5 μm may be increased through the addition of water or other dopants into the aerogel as further described below.

The thermal conductivity of an aerogel also depends strongly on the aerogel microstructure, which is improved in conjunction with tailoring of optical properties. The thickness of the aerogel also affects the properties of the aerogel, whereby thicker aerogels reduce the surface temperature and corresponding radiative and conductive losses. However, a thicker aerogel may also result in a decrease of the optical transmission. The optimal thickness is therefore that which maximizes the exergetic efficiency of the system. In some embodiments, an 8 mm aerogel sample has a thermal conductivity of less than 0.025 W/mK at room temperature and less than 0.1 W/mK at 400° C. By reducing the thermal losses from the system, aerogels also reduce the amount of optical concentration required for a desired thermal efficiency.

Silica Aerogel Fabrication Process

The synthesis of a silica aerogel is described herein. The synthesized silica aerogel may have properties suitable for use in an embodiment of the STAR. In general, several synthesis variables (e.g., chemical ratio, aging period, aging temperature and drying conditions) affect the spectral selectivity, thermal, and structural properties of aerogels. The absorption of radiation in an aerogel is proportional to its density. The scattering of radiation is a function of the particle size and pore size within the aerogel, which is not only a function of density, but also of the aerogel synthesis technique. By adjusting the pH of the sol-gel solution, the particle and mesoporous structure of aerogels can be tuned, thus changing the scattering coefficient. A further increase in spectral selectivity of the aerogel insulation layer may be achieved by doping aerogels with nanoparticles, such as tin oxide, indium tin oxide, carbon etc., that have strong absorption in the mid-infrared range.

The synthetic method for creating an embodiment of the silica aerogel described herein is based on Tamon et al.'s (hereafter referred to as Tamon) recipe for silica aerogel using tetramethyl orthosilicate (TMOS) as silica precursor and ammonia ($NH_3$) as catalyst. See H. Tamon, T. Sone, and M. Okazaki, *Journal of Colloid and Interface Science* 188 (1), 162-167 (1997), the entire contents of which are incorporated by reference herein. Unlike Tamon's method where $NH_3$ is mixed with TMOS solution before adding $H_2O$, methods disclosed herein combine $NH_3$ with $H_2O$ first, and then add the $NH_3$ solution to the TMOS solution.

Figure 1B:
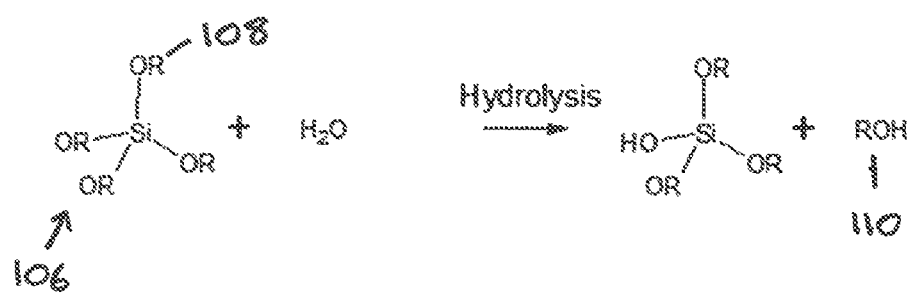
FIGS. 1B-1E are chemical diagrams illustrating silica aerogel fabrication in accordance with embodiments of the invention.
Figure 1C:
Figure 1D:
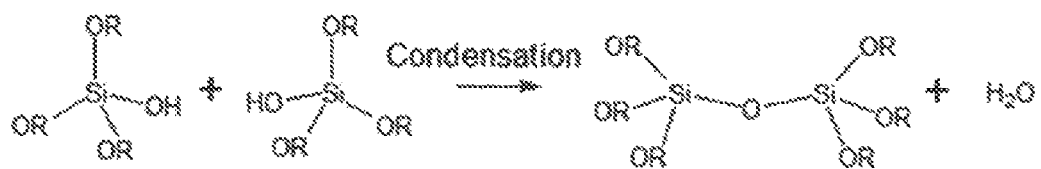
Figure 1E:
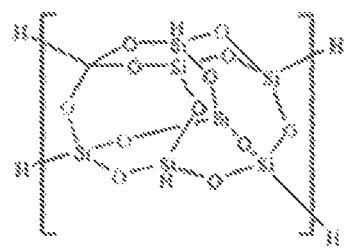

To synthesize silica aerogel, sol-gel polymerization may be used as depicted in FIG. 1A. In a process in accordance with an embodiment of the invention, TMOS is diluted in methanol to create a TMOS solution 100. The TMOS solution 100 is then mixed at room temperature with a solution of $NH_3$ and $H_2O$ 102 (step 104). In this step, TMOS 106 undergoes hydrolysis via the chemical process shown in FIG. 1B, where one of the methyl groups 108 of the TMOS 106 is replaced with a hydrogen, releasing methanol 110 in the process. After the sol is created through the mixing process 104, it is placed in a container of the desired shape and allowed to gel for e.g., two weeks 112. After two weeks, ethanol (EtOH) is added to the wet-gel in preparation for critical point drying (CPD) 114. EtOH is used as it is miscible with liquid carbon dioxide ($CO_2$). To prevent the formation of cracks, the wet-gel may be dried slowly to minimize capillary pressure during the CPD process 116. CPD may include cooling, introduction of liquid $CO_2$, pressurization, and depressurization. During depressurization at the end of CPD, a 100 psi/hr bleeding rate may be used to decrease the CPD chamber pressure from e.g., ~1300 psi to ambient pressure. The final structure of the silica aerogel 118 is shown in FIG. 1E.

In some embodiments, the aerogel may be made water-repellant by treating with a hydrophobic reagent. As before, the aged gel may be removed from the mold and transferred into a glass container with pure EtOH. The hydrophobic reagent (e.g., hexamethyldisilazane (($CH_3$)$_3$Si)$_2$NH) may be added in the ethanol, at a ratio to the ethanol of, e.g., 1:9. The aged gel may be then kept in the solution at room temperature and dried in CPD as described before.

In some embodiments, the high-temperature stability of the aerogel is improved by providing coating having a thickness of a few nanometers (e.g., <5 nm) to the aerogel. This coating may be formed by atomic layer deposition of $Al_2O_3$ or $HfO_2$. This allows the aerogel to maintain structural robustness even at temperatures>600° C., without sacrificing the optical transparency and thermal insulating properties.

This method, in which $NH_3$ is combined with $H_2O$ first and then added to the TMOS solution, promotes the protonation of $NH_3$ in $H_2O$ resulting in sufficient hydroxide ion (—OH) in the solution. The amount of —OH significantly affects the rate of hydrolysis and condensation reactions (FIGS. 1B-1D), which dictate the particle size and pore size of silica aerogel. Additionally, Tamon reports a mixing mole ratio of [$NH_3$]:[TMOS] of 0.0737 yielding an aerogel with a pore radius of 6 nm and a transmission of 84% at a 600 nm wavelength. To obtain a mean pore radius of 5 nm or less, a molar mixing ratio of $NH_3$:TMOS:water:methanol of 0.0025:1:4:6 may be used, with the ratio of $NH_3$ to TMOS being 0.0025 or less. For example, in one embodiment, a molar mixing ratio of $NH_3$:TMOS:water:methanol equal to 0.0019:1:4:6 yields a silica aerogel with a pore radius of 2.3 nm. This embodiment demonstrates a solar weighted transmittance of 96% at 8 mm sample thickness. Accordingly, a preferred molar ratio of NH3 to TMOS to achieve the desired pore size to achieve sufficiently high optical transparency is 0.0019±0.0005. Some embodiments demonstrated 95% transmittance at a 600 nm wavelength as shown in the graph depicted in FIG. 2.

The synthesis chemistry, pH and drying dynamics may be tuned to obtain OTTI layers with properties that allow for both low thermal conductivity (<0.025 W/mK at room temperature) and high transmissivity in the 250-1100 nm wavelength range for solar radiation.

Table 1 shows the properties of an un-annealed OTTI silica aerogel in accordance with an embodiment of the invention, compared with the properties of a commercially available aerogel as measured using Small Angle X-ray Scattering (SAXS).

TABLE 1

|  | Commercial aerogel sample | OTTI aerogel (un-annealed) |
| --- | --- | --- |
| Nominal Particle Size | 1.29 ± 0.05 nm | 1.12 ± 0.06 nm |
| Nominal Pore Size | 10.25 ± 0.03 nm | 5.86 ± 0.03 nm |
| Pore Standard Deviation | — | 3.1 nm |
| Mean scattering radius | 4.16 ± 0.01 nm | 2.92 ± 0.01 nm |

These measurements indicate smaller particle size and pore size of the synthesized OTTI silica aerogel than the commercially available aerogel. The smaller particle and pore size are advantageous in giving the OTTI silica aerogel the properties that enable it to be used in the STAR receiver.

Aerogel Property Enhancement Using Annealing

Figure 3A:
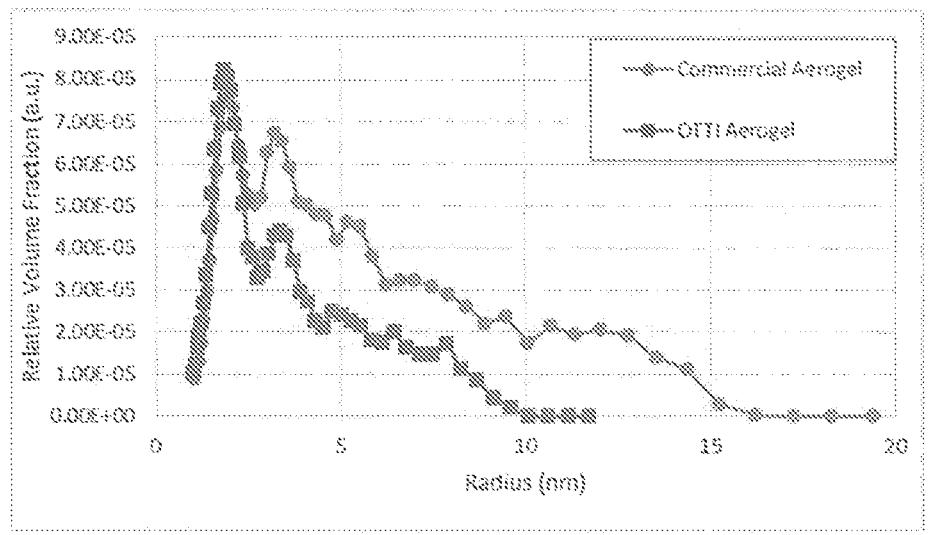
FIGS. 3A-3B are graphs comparing the pore size of a commercially available aerogel with a silica aerogel in accordance with an embodiment of the invention.
Figure 3B:
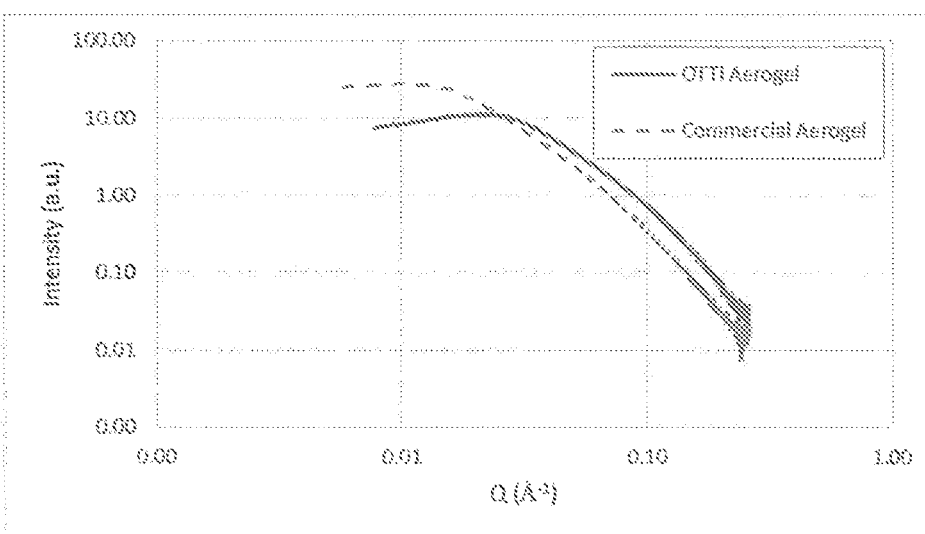

FIG. 3A is a graph of un-annealed aerogel pore size distribution (measured using SAXS). The graph shows the pore radius of the OTTI silica aerogel and of a commercially available silica aerogel monolith. The embodiment of an OTTI aerogel shown in FIG. 3A has a smaller pore radius over a narrower distribution than a commercially available aerogel. FIG. 3B shows the raw SAXS measurement data showing the scattering intensity as a function of the scattering vector. In FIG. 3B, Q is the scattering vector, where Q is inversely proportional to the size of the aerogel features. Thus, the exemplary OTTI silica aerogel demonstrates a greater number of small features (e.g., pores) than the commercially available aerogel.

Figure 4:
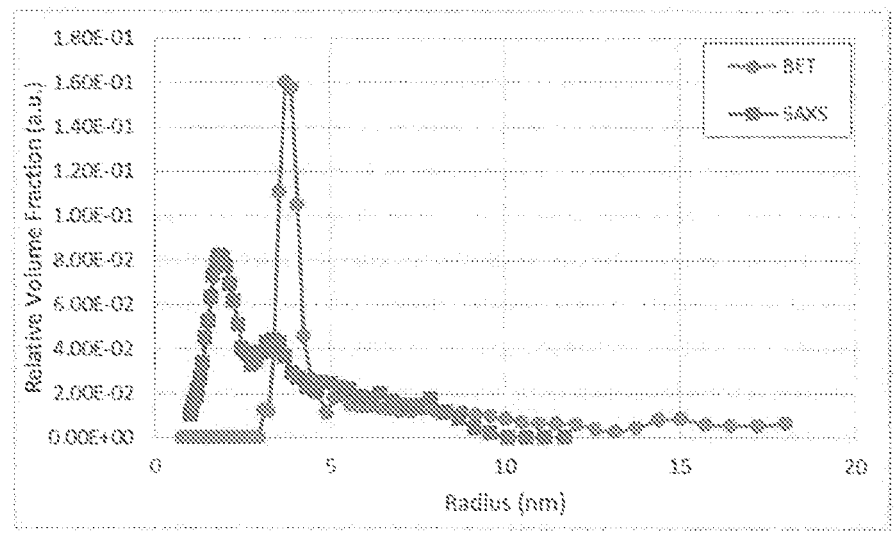
FIG. 4 is a graph of the pore radius in a silica aerogel in accordance with an embodiment of the invention.

FIG. 4 shows the OTTI silica aerogel pore size distribution as measured by SAXS and by Brunauer-Emmett-Teller analysis (BET) for an embodiment of an un-annealed OTTI aerogel. It is known by one of skill in the art that SAXS and BET yield slightly different measurements because they employ different methodologies. Nevertheless, both measurements of the pore size of the un-annealed aerogel show a peak in the distribution of a pore size of less than 5 nm.

High temperature annealing of the above described silica aerogel may eliminate hydrophilic groups (—OH) on the surface of aerogel resulting in enhancement of transmission in the absorption region (>1100 nm) by minimizing molecular absorption. Some embodiments of OTTI silica aerogels demonstrate suitable thermal stability at 400° C., which corresponds to the 391° C. maximum outlet temperature of the STAR receiver. Annealing may take place in an oven at a temperature of 400° C., reached by increasing the oven temperature by 10° C./min. For example, a 1200° C. dual split tube furnace, OTF-1200X, available from MTI Corporation may be used. In some embodiments, the aerogel is annealed for 336 hours. After annealing, the aerogel sample may be cooled in a ceramic dish.

Figure 5A:
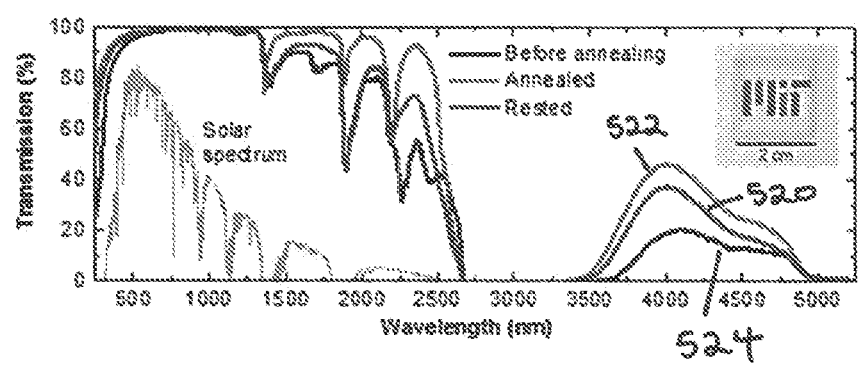
FIGS. 5A-5C are graphs of the transmittance of silica aerogels and their absorption and scattering coefficients in accordance with an embodiment of the invention.

For one embodiment, a durability test was conducted where the aerogel sample was annealed in an oven at high temperature for a long duration and allowed to rest at ambient conditions. For example, FIG. 5A shows the spectral transmission of a 4 mm thick aerogel sample annealed at 400° C. for 336 hours and rested for 552 hours 520 indicating an enhancement of transmittance in the solar spectrum (250-2500 nm) and the infrared spectrum of interest (>2500 nm). FIG. 5A compares the transmittance of this aerogel sample fabricated using the TMOS precursor before annealing at high temperature 524, after annealing 522, and after resting at ambient temperature 520. FIG. 5A inset shows an image of an optically transparent, thermally insulating monolithic silica aerogel sample. The data shows that while the maximum total transmission may be reached immediately after annealing, when the aerogel is allowed to rest at room temperature, the optical properties partially rebound towards their initial state. By allowing the samples to rest for long periods of time, a final rested state of material properties may be reached to compare to the initial and annealed states. Examining aerogel samples at these three stages allows the identification of properties that change irreversibly and reversibly with annealing, and the corresponding time scales, such as transmission, absorption, etc.

Figure 5B:
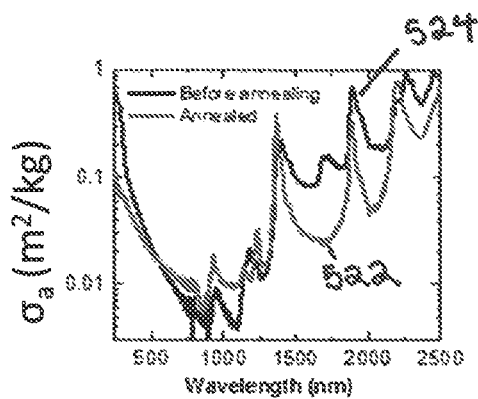

FIG. 5B shows the absorption coefficient, $\sigma_a$, corresponding to FIG. 5A which is the dominant mode of transmission loss at wavelengths>1000 nm of the silica aerogel before annealing. The data shows that the absorption coefficient may be changed over the wavelengths of interest by annealing. This change may be due to water adsorption within the inner surface of the material. Silica aerogels are naturally hydrophilic and can adsorb 5-15 wt % water in ambient conditions. Annealing the aerogel samples for a sufficiently long time and at high temperatures may drive out adsorbed water and decrease water absorption and overall density, resulting in higher transmission. The sample may readsorb water when left at ambient conditions, thereby reducing the overall transmittance. The readsorbed water may increase the mass of the rested aerogels and may cause the absorption coefficient to increase. However, irreversible change in the absorption coefficient is shown by the difference between the original transmittance and the transmittance of the annealed rested samples. This difference in transmittance may be caused by a surface chemistry change during which hydrophilic —OH bonds undergo a condensation reaction and join together to release an $H_2O$ molecule, leaving behind a Si—O—Si surface bond and making the aerogel more hydrophobic. The annealed and rested aerogels may have a decreased affinity for water absorption and may uptake less water after resting. The decrease in hydrophilicity may also increase the time needed to completely readsorb water, i.e., a sample annealed for a longer time may take longer to reach a final rested state.

Figure 5C:
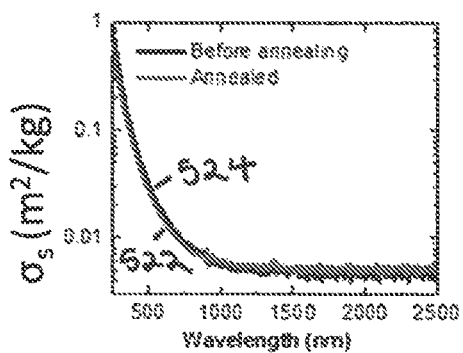

FIG. 5C shows the scattering coefficients, $\sigma_s$, for the same aerogel sample before 524 and after 522 being annealed for 336 hours at 400° C. The scattering coefficient (FIG. 5C) may have a smaller absolute change in comparison to the absorption coefficient (FIG. 5B), but since the scattering coefficient is highest at wavelengths where the solar spectrum peaks, a decrease in the scattering coefficient is advantageous in achieving high solar transmission. During annealing, the supporting network of the aerogel sample may experience structural relaxation and thermally-driven condensation. High temperature exposure may decrease the viscosity of the silica particles and allow for the material to contract and rearrange itself into a less energetic state, which may lead to a change in both particle and pore size of the network. A change in the particle and pore size may decrease the effective scattering size and increase the optical transmittance.

Figure 6A:
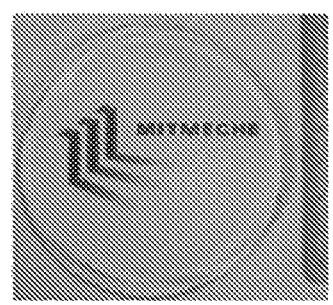
FIGS. 6A-6B are a photograph and micrograph, respectively, of silica aerogels in accordance with embodiments of the invention.
Figure 6B:
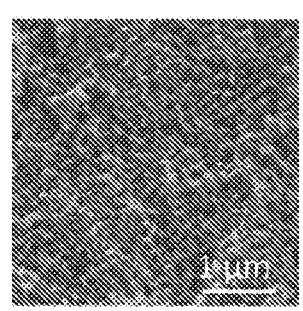

The optically transparent thermally insulating OTTI silica aerogel layers provide the desired optical transparency and thermal insulation for use in solar thermal receivers. The OTTI layer serves to reduce the radiation, conduction, and convection heat losses from the hot absorber to the ambient. FIG. 6A is a photograph of a 7 cm diameter CPD dried silica aerogel sample that has undergone annealing indicating the optical transparency of the sample. FIG. 6B is a scanning electron microscope (SEM) image of fabricated silica aerogel that has not been annealed with large surface area and high porosity. Some embodiments of the OTTI silica aerogel demonstrate 96% solar weighted transmittance through 8 mm thickness and a heat transfer coefficient<7 W/m²K between 400° C. and 100° C. In some embodiments, these properties may be retained even after subjecting aerogel samples to high temperatures (e.g., 400° C.) and high humidity (e.g., >80% RH) conditions for >100 hours.

Table 2 summarizes monolithic silica aerogel SAXS characterization before and after annealing at 600° C. for 4 hours;

TABLE 2

|  | Before Annealing | After Annealing |
|---|---|---|
| Solar-weighted transmittance (4 mm thick sample) | 95.6 ± 0.3% | 98.0 ± 0.3% |
| Particle size | 1.29 ± 0.05 nm | 1.30 ± 0.06 nm |
| Pore size | 4.70 ± 0.02 nm | 4.28 ± 0.02 nm |
| Mean scattering length | 2.91 ± 0.03 nm | 2.79 ± 0.02 nm |

The data in Table 2 demonstrates the increase in solar-weighted transmittance and decrease in pore size that may be achieved through annealing of the silica aerogel.

In some embodiments, the mean pore radius of the silica aerogel is less than 5 nm with a standard deviation of 3 nm. In some embodiments the silica aerogel has a mean particle size of 1.3 nm and includes solids of less than 10%. In some embodiments, an 8 mm thick silica aerogel in thermal contact with a blackbody absorber has a solar absorptance of greater than 0.9 and an IR emittance of less than 0.3 at high temperatures, such as ~400° C.

Aerogel Optical Properties

In a preferred embodiment, total transmission of the OTTI aerogel is increased while still maintaining good physical stability. Commercially available monolithic OTTI aerogels (e.g., Aerogel Technologies™) demonstrate transmission of ~85%. In some embodiments, the STAR receiver requires higher transmission (e.g., >95% transmission) than the transmission achieved with commercially available aerogels. High transmission may be achieved in the silica aerogel by controlling the pore size and silica particle size of the aerogel, i.e., small pore and particle sizes with narrow distributions increase transmission, through the above described synthesis method and annealing process.

Figure 2:
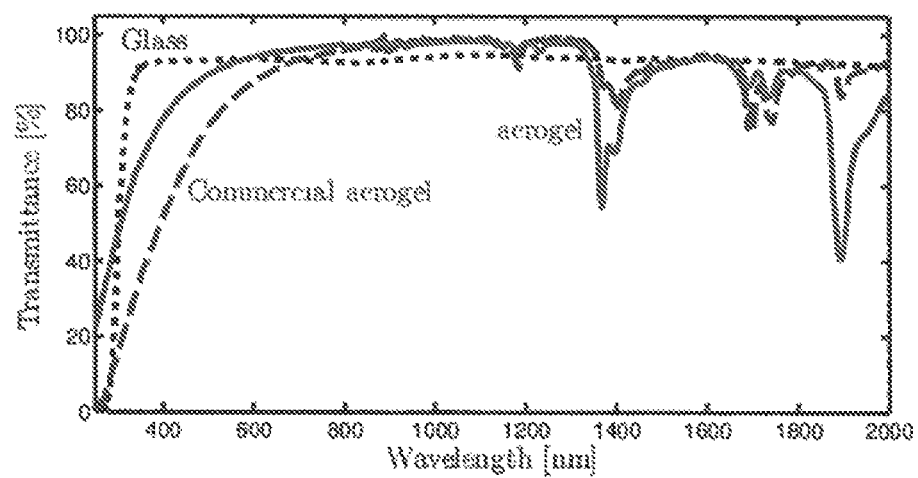
FIG. 2 is a graph comparing spectral transmittance of silica aerogel in accordance with an embodiment of the invention to glass and commercially available silica aerogel.

OTTI aerogels demonstrate suitable spectral properties for use with embodiments of the STAR. OTTI aerogels demonstrate 96% solar-weighted transmittance over a 250-2500 nm wavelength through an 8 mm thick sample, as indicated in FIG. 2, i.e., a graph of the comparison of transmittance of glass, a commercially available aerogel, and an embodiment of the silica aerogel used in the STAR measured with a UV-Vis-NIR spectrophotometer using an integrating sphere. In some embodiments, the silica aerogel has greater than 95% solar-weighted transmittance at a thickness of 8 mm for wavelengths selected from the range of 250 nm to 2500 nm. In general, the high porosity of aerogels (>90%) cause them to have a refractive index ~1, which minimizes reflection losses. Some embodiments of the OTTI aerogels also demonstrated suitable thermal stability at 400° C., which corresponds to the 391° C. maximum outlet temperature of the STAR receiver.

Figure 7:
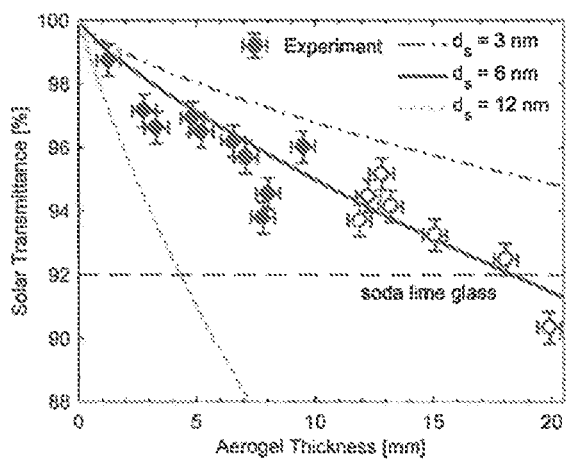
FIG. 7 is a graph of the transmittance through silica aerogel as a function of sample thickness.

FIG. 7 shows solar weighted transmittance as a function aerogel thickness in mm. The lines are model results for thicknesses for scattering diameters, $d_s$=3, 6, 12 nm (corresponding to scattering radii of 1.5, 3, 6 nm respectively) and the dots are measurements from a silica aerogel sample. The filled dots represent measurements on a single sample. The open dots represent measurements of a stack of two samples. The additional interface introduced by stacking two samples does not introduce noticeable deviation from the model because of the aerogel's refractive index of ~1. The dashed line shows the solar transmittance of soda lime glass as a reference. In this embodiment, the aerogel demonstrates increased solar transmittance over soda lime glass in agreement with that predicted by the model for a scattering diameter of 6 nm (equivalent to scattering radius of 3 nm).

Aerogel Thermal Properties

Generally, two properties determine how effective an aerogel is as an insulator: the spectral extinction coefficient and the thermal conductivity including solid conduction and gaseous conduction. The spectral extinction coefficient may be measured using Fourier transform infrared spectroscopy (FTIR). While it is difficult to measure the solid thermal conductivity directly because radiation cannot be eliminated, if the radiative properties of the aerogel are known, the thermal conductivity can be deduced from aerogel conductance measurements.

A detailed numerical model of the radiative transfer within an aerogel may be used to tune an OTTI layer for a given incident spectrum, operating temperature, and ambient conditions. A model may be used to solve the spectral equation of radiative transfer and couple it to the heat equation. The radiative transfer equation (Equation 1) and the heat equation (Equation 2) are shown below:

$$\frac{dI_\lambda(\Omega)}{dx} = -K_{e_\lambda} I_\lambda(\Omega) + K_{a_\lambda} I_{b\lambda} + \frac{K_{s\lambda}}{4\pi} \int_0^{4\pi} I_\lambda(\Omega') p_\lambda(\Omega' \to \Omega) d\Omega' \quad (1)$$

$$\frac{d}{dx}\left(k\frac{dT}{dx} - q_R\right) = 0 \quad (2)$$

where $K_{e\lambda}$ is the spectral extinction coefficient, $K_{s\lambda}$ is the scattering coefficient, $K_{a\lambda}$ is the absorption coefficient, $I_\lambda$ is the spectral intensity, $I_{b\lambda}$ is the spectral blackbody intensity, $p_\lambda$ is the scattering phase function, $\Omega$ is the solid angle, x is the position in the sample, T is the temperature, k is the thermal conductivity, and $q_R$ is the radiative heat flux. The radiative heat flux is given below:

$$q_R = \int_0^\infty \int_{4\pi} I_\lambda(\Omega) d\Omega d\lambda \quad (3)$$

The model may use the spectral extinction coefficient ($K_{e\lambda}$), which is the sum of the scattering ($K_{s\lambda}$) and absorption coefficients ($K_{a\lambda}$), as an input to solve the radiative transfer equation.

Figure 8:
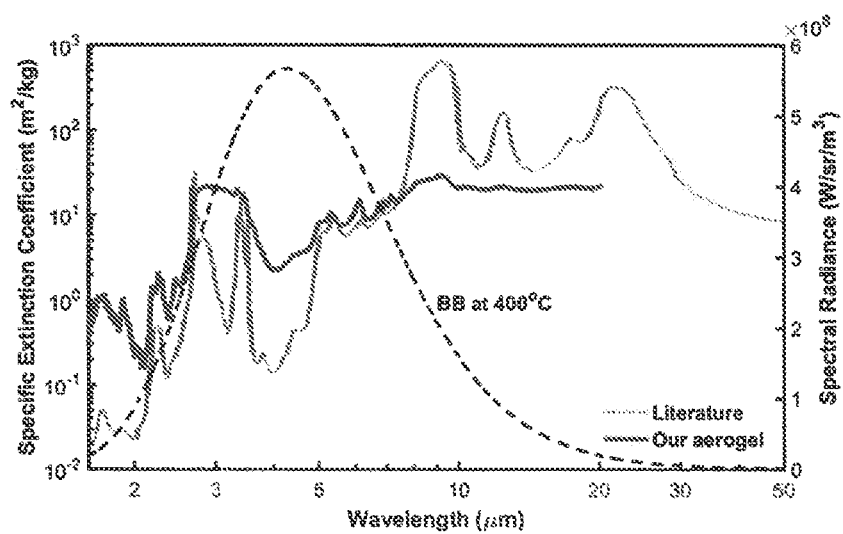
FIG. 8 is a silica aerogel specific extinction coefficient measured and reported in the literature (U. Heinemann, R. Caps, and J. Fricke, *International Journal of Heat and Mass Transfer* 39 (10), 2115 (1996))

FIG. 8 shows the measured specific spectral extinction coefficient of an un-annealed embodiment of the silica aerogel used in the STAR receiver. Also shown in FIG. 8 are the extinction coefficients from the literature and the blackbody spectrum at 400° C. (black dashed line) for reference. In some embodiments, the measured extinction coefficient for the silica aerogel is higher than the literature data, particularly in the 3-5 μm wavelength region. The higher extinction coefficient may be attributed to absorption due to water molecules "bonded" to the aerogel surface. Larger extinction of the silica aerogel may advantageously translate to better insulation at high temperatures around 400° C.

The typical aerogel 400° C. black-body weighted specific extinction coefficient may be measured to be around 10±0.5 $m^2$/kg, based on IR transmittance measurements (shown in FIG. 8). In some embodiments, the 400° C. black-body weighted specific extinction coefficient is greater than 8 m²/kg for wavelengths selected from the range of 1.5 μm to 15 μm. The relatively high value of the specific extinction coefficient indicates the effectiveness of the OTTI aerogel to suppress thermal radiation at high temperatures around 400° C.

The radiative transfer equation (RTE) model, described previously, predicts heat transfer coefficients of <7 W/m²K at the operating temperatures of the STAR receiver (e.g., $T_{High}$=400° C. and $T_{Low}$=100° C.). Low values of heat transfer coefficients represent an insulator at the high operating temperatures of the STAR receiver.

Receiver Design and Performance

Figure 9A:
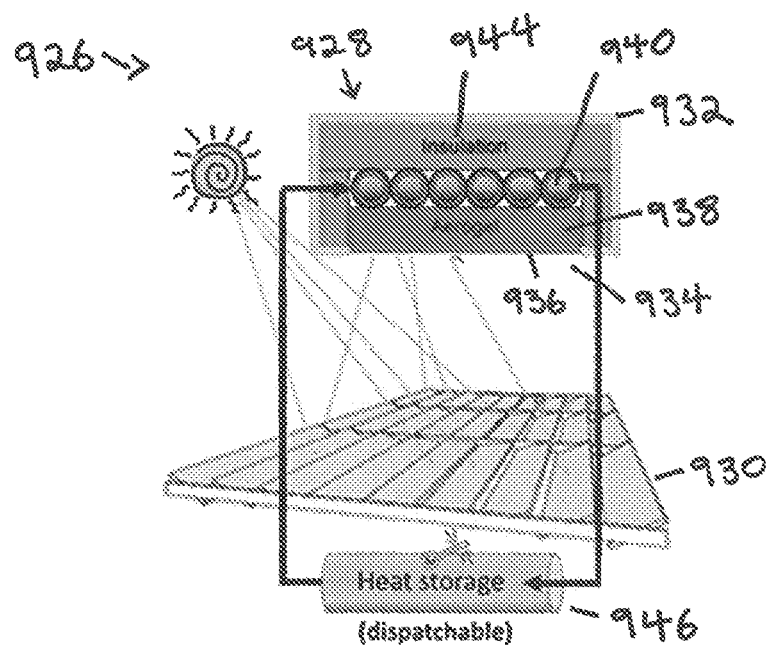
FIGS. 9A-9B are illustrations of a STAR receiver and a concentrating solar energy system in accordance with an embodiment of the invention.
Figure 9B:
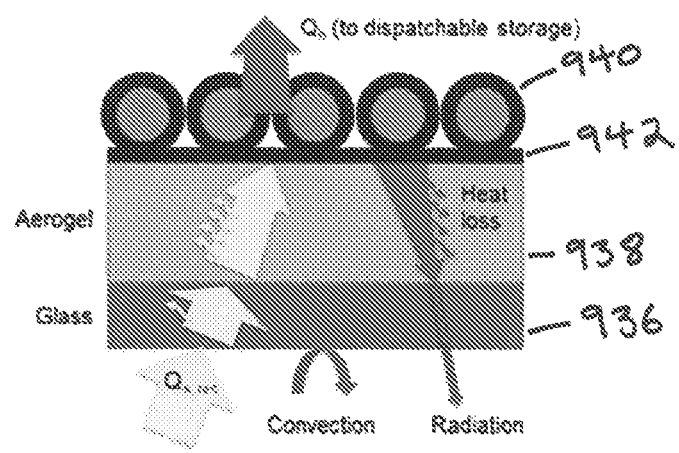

Referring to FIG. 9A, a concentrating solar energy system 926 includes a solar thermal aerogel receiver (STAR) 928 and an array of reflectors 930 configured to direct sunlight to the STAR 928. Referring also to FIG. 9B, the STAR 928 includes an opaque frame 932 defining an opening 934. The frame is preferably made from a rigid material, such as stainless steel. A transparent outer layer 936 may be disposed in the opening 934 and is preferably formed from a transparent, rigid material such as glass, and defines at least a portion of a flat bottom surface of the frame 932. In some embodiments, the transparent layer 936 may be formed of a robust, transparent polymer, e.g., fluorinated ethylene propylene (FEP). The use of a polymer may be advantageous by minimizing the optical losses (due to its low refractive index compared to glass), as well as reducing the cost and weight of the receiver. A layer including aerogel 938, such as the OTTI silica aerogel described above, is disposed in the frame 932, with at least a portion of the aerogel layer being proximate the opening in the frame. In some embodiments, as long as the aerogel layer is sufficiently supported in the frame, no transparent outer layer needs to be included in the opening, thereby further reducing costs. In other embodiments, the transparent outer layer 936 may be provided to help support and protect the aerogel layer.

The layer of aerogel 938 is in thermal contact with and proximate to one or more heat transfer fluid pipes 940 housed in the frame 932. The absence of a gap or vacuum between the aerogel layer and the heat transfer fluid pipes, as is present in currently available receivers, reduces heat loss due to conduction and convection and reduces the receiver height. A reduction in receiver height may increase the amount of incident light that travels through the aerogel layer and reaches the heat transfer fluid pipes. The number of heat transfer fluid pipes depends on the desired capacity of the receiver. In some embodiments, as illustrated, the receiver 928 contains six heat transfer fluid pipes. One or more of the heat transfer fluid pipes 940 may include a black absorber layer, e.g., black paint, to increase absorption.

A black absorber layer 942 may be disposed on the aerogel layer 938 and/or on the one or more heat transfer fluid pipes 940. The black absorber layer 942 may be formed from a black material, e.g., stainless steel coated with black paint.

In some instances, the aerogel 938 defines an air gap between the aerogel 938 and the transparent outer layer 936 to prevent condensation on the interior of the transparent outer layer that may accumulate from water in the aerogel at high temperatures. In other embodiments, the aerogel layer 938 is disposed in the frame 932 in direct contact with the transparent outer layer 936. In this embodiment, the transparent outer layer 936 provides mechanical stability to the aerogel layer 938. An additional advantage may be increased heat transfer between the transparent outer layer 936 and the aerogel layer 938.

An insulating layer 944 may be disposed in the frame 932, e.g., above the pipes 940 and/or adjacent to the aerogel 938 in the portion of the frame 932 that is not optically active. The insulating layer 944 increases the efficiency of the receiver 928 by preventing heat loss.

In some instances, the pipe or pipes 940 may be configured to relay a heat transfer fluid to a heat storage unit 946 from which heat may be dispatched.

In one embodiment, the STAR 928 is coupled with at least one reflector, e.g., a reflector array 930, such as an LFR to form the concentrated solar energy system. The one or more reflectors may be configured to direct sunlight to the opening 934. The flat geometry, i.e., flat bottom surface 936, of the receiver 928 makes it compatible with an LFR and helps reduce IR losses.

The receiver 928 may be sized according to the width of the absorber layer or number of heat transfer fluid pipes, such that at least 90% of the incident light from the reflector hits the absorber or heat transfer fluid pipes. The height of the receiver may vary with the amount of insulation and the length may vary depending on the receiver's intended use, e.g., from 100 cm to 1000 m. For example, the frame 932 may be 10 cm×30 cm×500 cm.

A thickness of the aerogel may be selected from a range of 5 mm to 15 mm, depending on the aerogel properties and solar concentration. Referring also to FIG. 7, if the aerogel layer 938 is too thick, the transmittance may be too low for the intended application. If the aerogel layer 938 is too thin, then it might result in excessive heat loss from the bottom surface. A thickness of the transparent outer layer 936 may be selected from the range of 1 mm to 3 mm. The transparent outer layer is preferably thick enough that it is not prone to breaking, but not so thick that optical losses occur. An additional advantage of a thinner transparent layer is that it reduces the overall cost of the receiver.

Referring also to FIG. 9B, the receiver 928 may generate and capture heat as follows. Light from the sun may be reflected off the reflector array 930 towards the receiver 928 and transmitted through the transparent outer layer 936. Some solar radiation may be reflected by the transparent outer layer 936 and thereby may be lost to the ambient. Some heat may be released by the black absorber layer 942 and emitted as radiation. Some heat may also be lost by convection. The heat that is trapped by the black absorber 942 may be transferred through piping via heat transfer fluid to the heat storage unit 946 to be used for e.g., electricity generation or other industrial processes.

In some embodiments, the STAR receiver receives solar radiation from the reflector array at a concentration of about 40 suns. In some embodiments of the STAR the transparent outer layer 936 defines a relatively wide aperture (e.g., 10-40 cm, compared to 7-9 cm for industry standard vacuum tubes). Additionally, in some embodiments, the receiver may be fixed and supported more effectively to allow for a greater range of optimization in design geometry. The use of the previously described silica aerogel in the design allows for operating temperatures comparable to conventional linear CSP receivers with less concentration area, meaning the footprint and supporting structures may be reduced without sacrificing efficiency.

The performance of an ideal blackbody absorber coupled with the previously described OTTI silica aerogel depends on several factors including the operating temperature, aerogel thickness, and optical concentration. For example, for an 8 mm thick aerogel sample paired with an ideal blackbody absorber having an absorptance of 1 at 400° C., the solar absorptance is 0.96 and the emittance in the IR is around 0.2.

This expected performance relates to operation in air and is comparable to state-of-art high-temperature spectrally selective surfaces that operate in vacuum. In some embodiments, an 8 mm thick aerogel in thermal contact with a blackbody absorber has a solar absorptance of greater than 0.9 and an IR emittance of less than 0.3 at high temperature such as ~400° C.

Figure 10A:
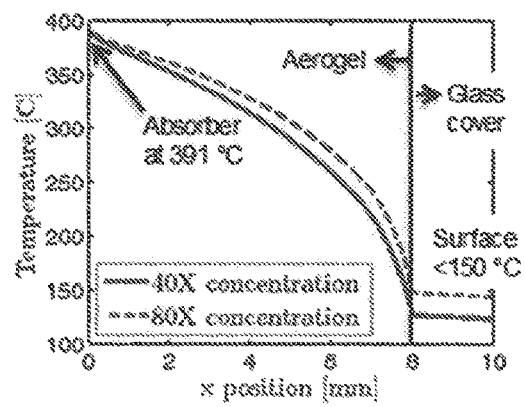
FIGS. 10A-10B are graphs of the temperature profile within the OTTI aerogel layer and the receiver efficiency in accordance with embodiments of the invention.

FIG. 10A shows a modeled temperature profile in the aerogel and transparent outer layers of the STAR receiver. Thermal transport through the aerogel is modeled by coupling the equation of radiative transfer and the heat equation in one dimension (through the thickness of the aerogel) as shown before. The temperature increases in the thickness of the aerogel layer closer to the absorber layer, which may have an operating temperature of 391° C., while the surface of the transparent outer layer may be less than 150° C. The temperatures at 80 suns are higher than the temperatures at 40 suns.

Figure 10B:
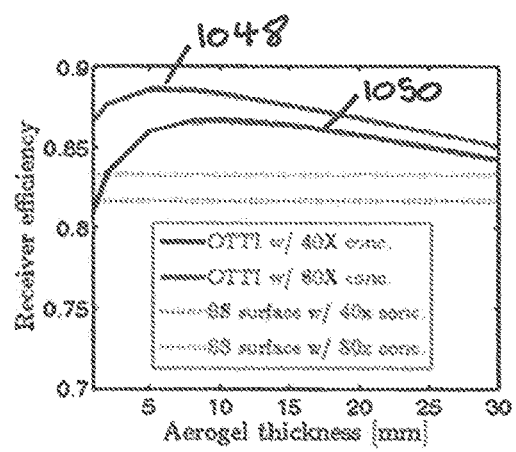

FIG. 10B is a graph of the STAR efficiency at concentrations of 40 and 80 suns 1050, 1048. The dashed lines in FIG. 10B show the performance of a state-of-the art spectrally selective (SS) surface for comparison. Efficiency increases with aerogel thickness up to about 5-10 mm (depending on the concentration) and the receiver efficiency at that thickness is significantly higher than that of a spectrally selective surface, i.e., at least 0.85.

For a CSP system including the STAR, with properties of the synthesized OTTI silica aerogel previously described, the model predicts a peak exergetic efficiency of 37.2% and an annual average exergetic efficiency of 26.3%. Modeling may be used to identify the aerogel properties that are required for improved system performance targets. For example, for a 39.5% peak efficiency, the aerogel will need to be 98% transmitting and have a heat transfer coefficient of 4 $W/m^2K$ through an 8 mm thickness. The estimated annual average exergetic efficiencies in this example are above 31% with peak efficiencies exceeding 42% if the receiver is operated at 500° C. Modeling of the heat transfer fluid (HTF) performance uses well established heat transfer correlations and fluid properties known to one of skill in the art. Heat transfer within the solid, non-aerogel portions of the receiver (i.e., pipe walls, absorber plates, insulation, etc.) may be modeled with Fourier's law.

Receiver Design and Fabrication

Figure 11:
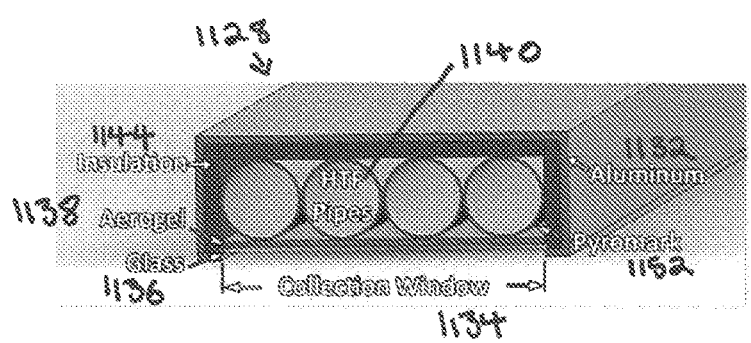
FIG. 11 is a schematic showing the different components of a STAR receiver in accordance with an embodiment of the invention.
Figures 12A, 12B, 12C:
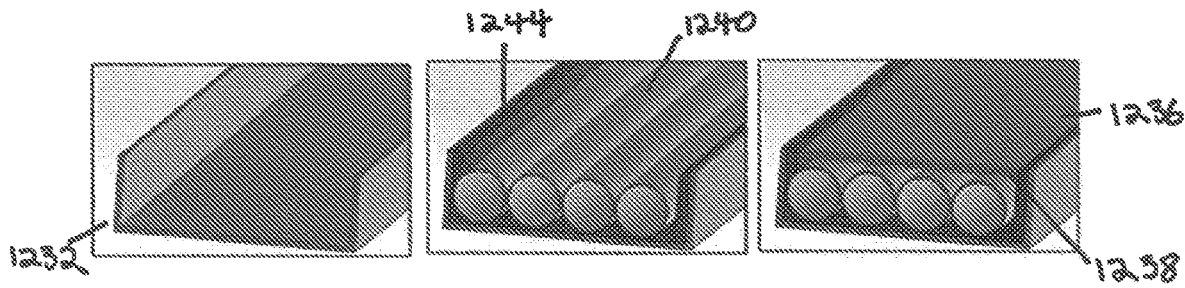
FIGS. 12A-12E are illustrations of an assembly process for a STAR receiver, in accordance with embodiments of the invention.
Figures 12D, 12E:
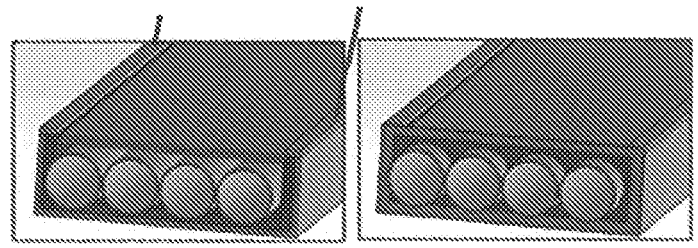

To decrease the total cost of the receiver, the assembly process may be simplified to use cost-effective components and processes. Referring to FIG. 11, the STAR receiver 1128 may have a frame 1132 formed from a relatively inexpensive material, such as aluminum or stainless steel. The transparent outer layer 1136, i.e., glass or transparent polymer, is disposed in the collection window 1134 of the frame 1132. A layer of aerogel 1138, such as the previously described OTTI silica aerogel, is disposed in the collection window 1134, interior to the transparent outer layer 1136. The layer of aerogel 1138 is in thermal contact with one or more HTF pipes 1140, which may be coated with black paint 1152, such as Pyromark™ (LA-CO Industries Inc.). A layer of insulation 1144, such as Microsil microporous insulation (Zircar Ceramics, Inc.), is disposed in the frame.

An exemplary process for fabricating an embodiment of a single module section of the STAR receiver is shown in FIGS. 12A-12E. First, an aluminum U-channel frame 1232 is manufactured as a continuous piece via an extrusion process. Next, the insulation 1244 is placed into the channel in discrete blocks (bottom block and side blocks). The stainless steel pipes 1240, coated with Pyromark™ black paint, are laid into the open cavity of the insulation 1244 and evenly spaced. The aerogel 1238 and transparent outer layer 1236 are then laid on top of the pipes 1240, and a small piece of insulation is used to secure and center the glass. Two small aluminum strips 1254a, 1254b are then bonded to the transparent outer layer 1236 (using a ceramic to metal bonding agent) and welded to the aluminum U-channel frame 1232. The receiver is then rotated so that the U-channel is facing downward and the modules are ready to be transported for installation.

A utility scale plant may include several 5 m long STAR modules joined together. Two modules may meet at a fixed support where each module has exposed HTF pipes. Bellows connectors may be welded to the pipes, allowing the modules to couple thermally. A custom made insulation piece may be added around the bellows to prevent heat loss from the length of receiver that is not optically active (i.e., connection area between the two modules). Above the insulation piece an aluminum capping element may be fixed to each module through a set of linear fasteners.

Figure 13A:
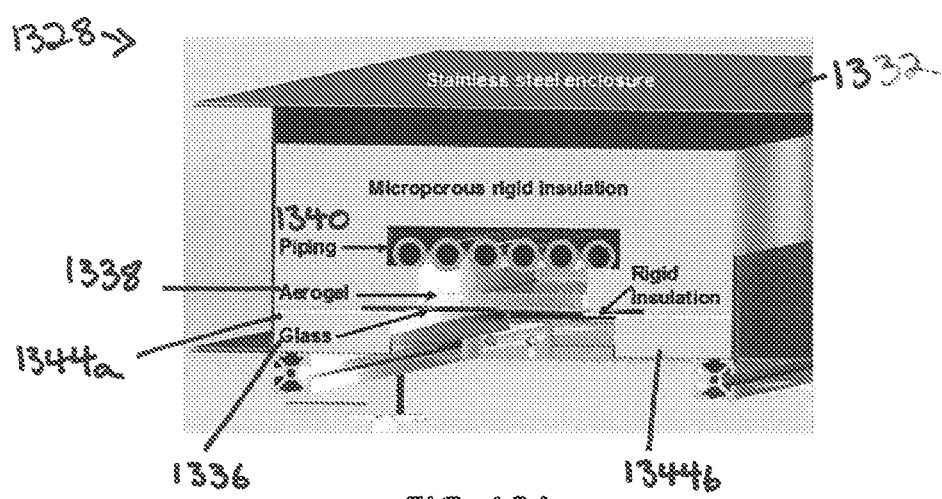
FIGS. 13A-13C are schematic illustrations of the STAR receiver in accordance with alternative embodiments of the invention.
Figure 13B:
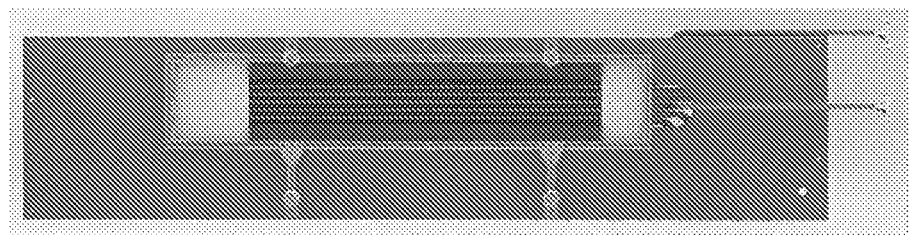

An alternative embodiment of the STAR receiver is shown in FIGS. 13A (perspective view) and 13B (bottom view). The receiver 1328 includes a stainless steel sheet metal enclosure 1332 fabricated out of two C-channels on the sides. The top cover and different receiver components at the bottom are bolted in place using C-channels with gaskets to prevent any water leakage into the receiver 1328. This embodiment of the receiver 1328 includes a removable section that houses the OTTI aerogel 1338 surrounded by rigid, non-transparent insulation 1344. The OTTI aerogel 1338 is protected by a transparent outer layer 1336. In this embodiment, the OTTI aerogel 1338 does not sit directly on the transparent outer layer 1336. Since the transparent outer layer 1336 is exposed to air and is lower in temperature than the aerogel 1338, the water evaporated from the aerogel 1338 may condense on the transparent outer layer 1336 during heat up, and this may damage the aerogel 1338. This problem is avoided by suspending the aerogel 1338 on the edges such that an air gap is defined between the aerogel 1338 and transparent outer layer 1336. The exposed area of the transparent outer layer 1336 is minimized by adding non-transparent thermal insulation 1344a, 1344b below it in the non-optically-active area of the receiver 1328. A thick non-transparent insulation layer 1344a, 1344b is present below the transparent outer layer 1336 on the side and another thin, rigid insulation layer is added just below the transparent outer layer 1336 to minimize heat loss while preventing any optical interference to the concentrated sunlight (incident from below). To further improve performance, the non-transparent insulation on the sides of the aerogel 1338 inside the cavity between the aerogel 1338 and pipe assembly 1340 may be covered with specular, highly reflecting surfaces such as a gold leaf.

Figure 13C:
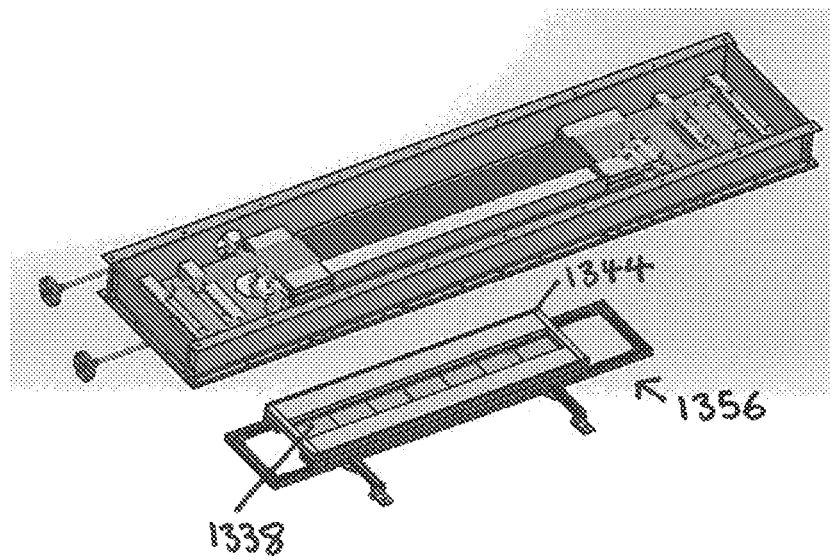

Referring to FIG. 13C, the STAR receiver 1328 has a removable section 1356 that houses the aerogel 1338 in a rigid, opaque insulation 1344. This facilitates replacement of the aerogel.

Receiver Geometries

Figure 14A:
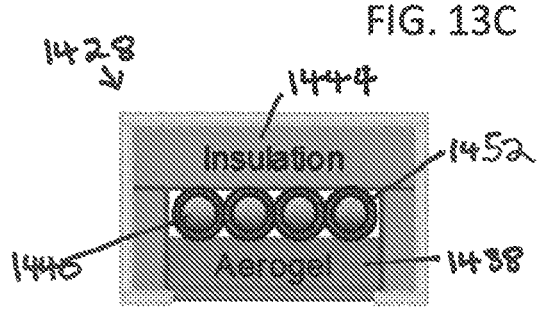
FIGS. 14A-14D are illustrations of different receiver configurations of the STAR system in accordance with embodiments of the invention.
Figure 14B:
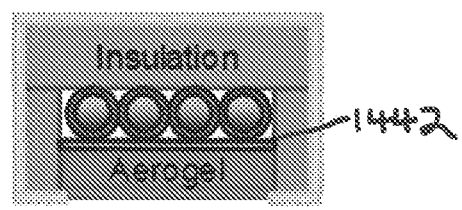
Figure 14C:
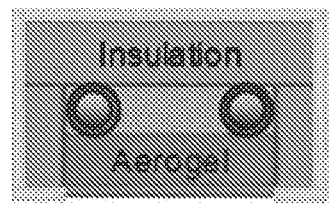

Different receiver configurations are illustrated in FIGS. 14A-14D. Referring to FIG. 14A, the HTF tubes 1440 may be directly coated with the solar absorber 1452, and insulated with an aerogel layer 1438 on the illuminated side of the receiver 1428 and insulated with microporous ceramic insulation 1444 on the other sides. Alternative embodiments of the STAR receiver may use an absorber plate 1442 rather than having the tubes 1440 absorb sunlight directly (FIG. 14B) or use vertical fins perpendicular to the pipes with an absorber coating connecting the tubes 1440 (FIG. 14C).

Figure 14D:
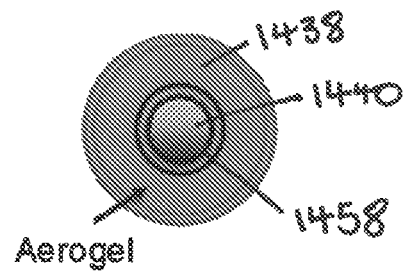

A "vacuum tube" configuration is shown in FIG. 14D that uses a receiver similar to a state of the art vacuum tube, but with an aerogel 1438 in place of the vacuum tube. In this embodiment, an air-stable black coating 1458 is used rather than a spectrally selective coating. This embodiment of the STAR receiver may be suited for use with PTC, which is typically used with vacuum tubes, and may be less expensive and more robust than existing vacuum tube receivers due to the lack of vacuum. Using the OTTI silica aerogel performance metrics mentioned above, the performance may be slightly lower than current vacuum tubes (37.3% peak exergetic efficiency for this embodiment of the STAR receiver vs. 39.7% peak exergetic efficiency for the state-of-art in PTC). However, this embodiment of the STAR receiver is not susceptible to loss of vacuum, a problem for receivers using vacuum tubes (e.g., due to hydrogen decomposition of high temperature HTFs and subsequent permeation into the vacuum gap).

Solar Thermal Receiver Assembly

Figure 15:
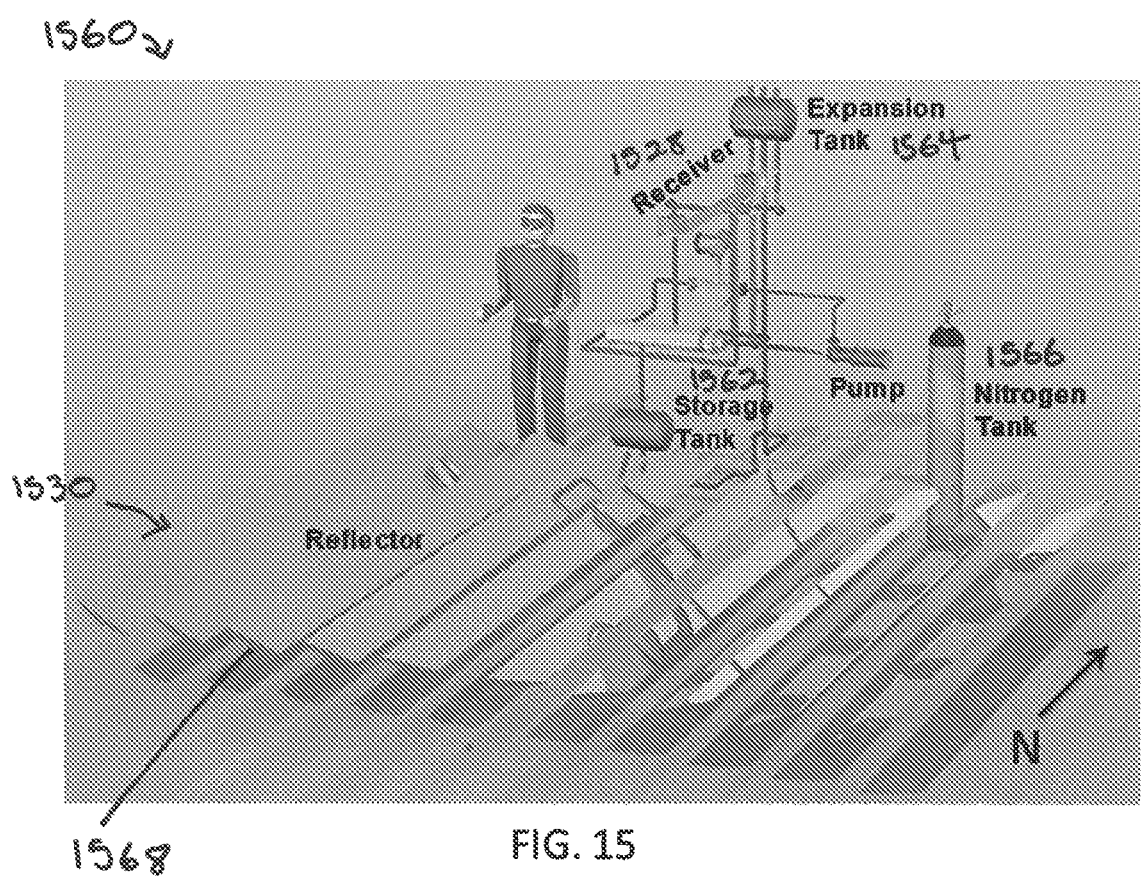
FIG. 15 is a CAD model of a layout of the STAR receiver in accordance with an embodiment of the invention.

An outdoor test system 1560 may be used to measure the performance of various embodiments of the STAR receiver 1528. FIG. 15 provides a CAD model of the outdoor test system 1560. The central STAR receiver 1528 is elevated and centrally located over a reflector array 1530. As shown by the CAD model, the reflector array 1530 is symmetric about the receiver centerline. The reflectors are oversized to the south to minimize optical end effects associated with low solar elevation angles. All piping and process equipment (e.g., a storage tank 1562, an expansion tank 1564, a nitrogen tank 1566, etc.) is located on the north side of the reflector array 1530 to minimize shading during most solar positions. The exemplary reflector array 1530 consists of ten mirror assemblies 1568, each having a reflector element, a motor for single-axis tracking, and associated supporting brackets.

Figure 16:
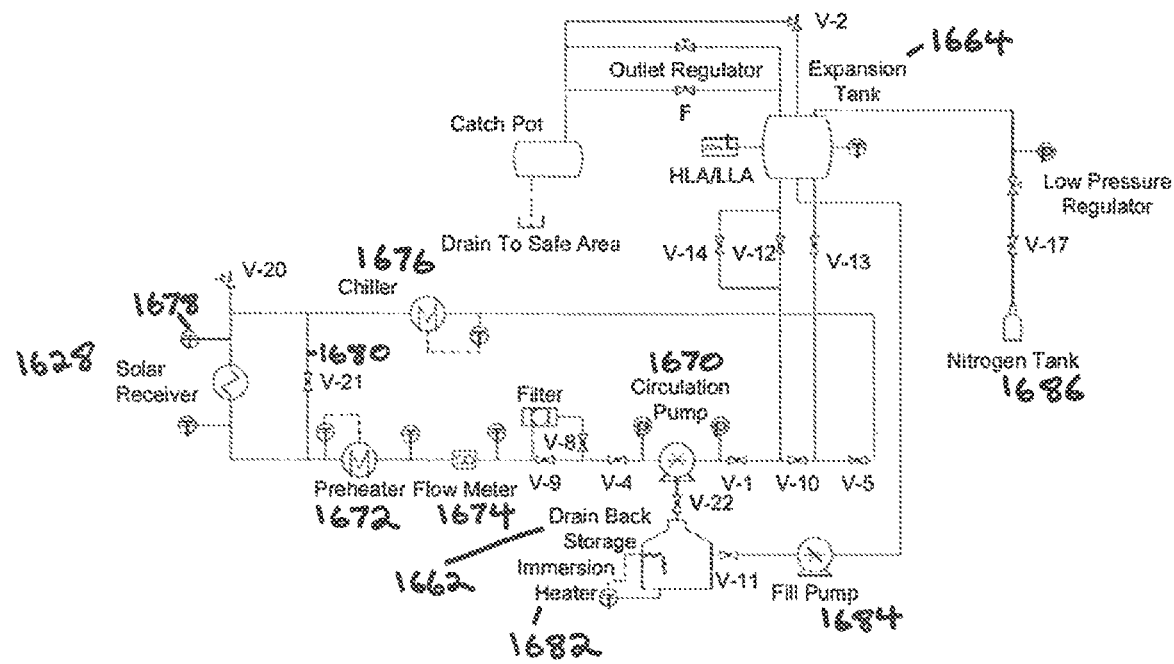
FIG. 16 is a piping and instrumentation diagram for the STAR receiver in accordance with an embodiment of the invention.

FIG. 16 is a piping and instrumentation diagram for the outdoor test system. A circulation pump 1670 circulates the HTF through the STAR receiver 1628 and the additional process equipment including an auxiliary heater 1672, flow meter 1674, chiller 1676 and instrumentation to measure the pressure and temperature at various points along the flow path. The thermocouples 1678 closest to the receiver are used in the performance characterization of the various embodiments of the STAR receiver 1628. These thermocouples 1678 are placed exactly at the receiver HTF inlet and exit points. The bypass/recirculation line 1680 allows for prototype setup, calibration, and testing operation without the STAR receiver 1628 physically present. An expansion tank 1664 allows for HTF volume expansion due to change in temperature, and is mounted at the highest point in the system. The drain back storage tank 1662 allows the entire volume of HTF to be drained by gravity at night time to prevent freezing of the HTF within the piping loop when the ambient temperature drops below 12° C. The immersion heater 1682 then allows any solidified HTF to be melted and heated to a pumpable temperature such that the system can be refilled through the expansion tank 1664 using the fill pump 1684. The nitrogen tank 1686 is connected to the expansion tank 1664 and serves the dual function of providing the required overpressure to the system to prevent fluid boiling at elevated temperatures, and blanketing the HTF with an inert gas to prevent fluid oxidation and reduce fire hazards.

Standard piping and connections are used throughout to minimize set up time. Since the physical system is symmetric about the receiver, for ease of setup and wiring, the controls mimic the physical layout. A primary control cabinet (not shown) houses data acquisition (DAQ) components that are shared throughout the prototype (such as pump and cooler controllers and thermocouple board); while the auxiliary control cabinets are used for motor controllers for the linear Fresnel reflector elements.

Outdoor Prototype

Figure 17:
FIG. 17 is a photograph of an on-sun test prototype of an embodiment of the STAR receiver.

FIG. 17 is a photograph of an embodiment of a concentrating solar energy system 1726 that includes the demo STAR receiver 1728 during an on-sun test. On-sun testing of the demo may be used to determine the stagnation temperature of an aerogel insulated absorber.

Figure 18:
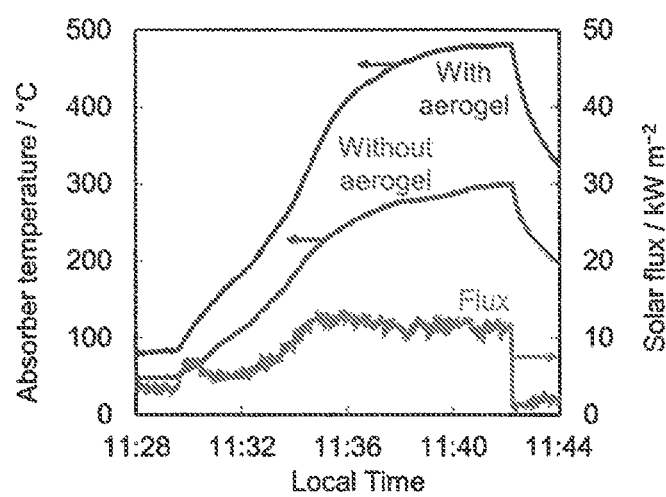
FIG. 18 is a graph comparing the stagnation temperatures of an aerogel-insulated solar absorber in accordance with embodiments of the invention to a bare absorber.

FIG. 18 shows a plot of an on-sun experimental run comparing the stagnation temperature (the maximum possible temperature achievable for the given configuration and input conditions, i.e., temperature when no heat is taken away by the heat transfer fluid) of the two absorbers, one having an aerogel layer and one without. In operation, when heat is extracted by the HTF to generate exergy, by definition the absorber temperature is less than the stagnation temperature. The solar flux at the focal plane may be monitored using a circular foil radiometer "fluxgage". The data of FIG. 18 demonstrates that at a moderate concentration ratio of around 12 suns, the aerogel allows absorber temperatures as high as 480° C. In comparison, the bare absorber reached a peak temperature of 350° C.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A solar thermal aerogel receiver comprising:
an opaque frame defining an opening;
an aerogel layer disposed in the opaque frame, with at least a portion of the aerogel layer being disposed proximate the opening; and
a heat transfer fluid pipe in thermal contact with and proximate the aerogel layer.

2. The solar thermal aerogel receiver of claim 1, wherein the aerogel layer comprises silica aerogel.

3. The solar thermal aerogel receiver of claim 2, wherein the silica aerogel defines a porous material with pores having a mean radius of less than 5 nm with a standard deviation of 3 nm.

4. The solar thermal aerogel receiver of claim 1, wherein the aerogel layer comprises an absorber layer.

5. The solar thermal aerogel receiver of claim 1, wherein the aerogel layer comprises silica aerogel having (i) greater than 95% solar-weighted transmittance at a thickness of 8 mm for wavelengths selected from the range of 250 nm to 2500 nm; and (ii) a 400° C. black-body weighted specific extinction coefficient of greater than 8 $m^2/kg$ for wavelengths selected from the range of 1.5 μm to 15 μm.

6. The solar thermal aerogel receiver of claim 5, wherein the opaque frame further comprises an insulating layer.

7. The solar thermal aerogel receiver of claim 1, wherein the heat transfer fluid pipe comprises a black absorber layer.

8. The solar thermal aerogel receiver of claim 1 further comprising a transparent outer layer disposed in the opening in the opaque frame.

9. The solar thermal aerogel receiver of claim 8, wherein the transparent outer layer comprises at least one of glass and a transparent polymer.

10. The solar thermal aerogel receiver of claim 8, wherein the transparent outer layer forms at least a portion of a flat bottom surface of the opaque frame.

11. The solar thermal aerogel receiver of claim 8, wherein the aerogel layer is in direct contact with the transparent outer layer.

12. The solar thermal aerogel receiver of claim 8, wherein the transparent outer layer and the aerogel layer define an air gap therebetween.

13. The solar thermal aerogel receiver of claim 1, wherein the receiver has a maximum solar-to-exergy conversion efficiency of greater than 35% at an optical concentration of 40 suns.

14. A concentrating solar energy system comprising:
   a solar thermal aerogel receiver comprising:
      an opaque frame defining an opening,
      an aerogel layer disposed in the opaque frame, with at least a portion of the aerogel layer being disposed proximate the opening, and
      a heat transfer fluid pipe in thermal contact with and proximate to the aerogel layer; and
   at least one reflector configured to direct sunlight to the opening.

15. The concentrating solar energy system of claim 14, wherein the aerogel layer comprises an absorber layer.

16. The concentrating solar energy system of claim 14, wherein the aerogel layer comprises silica aerogel.

17. The concentrating solar energy system of claim 16, wherein the silica aerogel defines a porous material with pores having a mean radius of less than 5 nm with a standard deviation of 3 nm.

18. The concentrating solar energy system of claim 14, wherein the aerogel layer comprises silica aerogel having (i) greater than 95% solar-weighted transmittance at a thickness of 8 mm for wavelengths selected from the range of 250 nm to 2500 nm; and (ii) a 400° C. black-body weighted specific extinction coefficient of greater than 8 $m^2$/kg for wavelengths selected from the range of 1.5 μm to 15 μm.

19. The concentrating solar energy system of claim 14, wherein the heat transfer fluid pipe comprises a black absorber layer.

20. The concentrating solar energy system of claim 14, wherein the opaque frame further comprises an insulating layer.

21. The concentrating solar energy system of claim 14, wherein the solar thermal aerogel receiver has a maximum solar-to-exergy conversion efficiency of greater than 35% at an optical concentration of 40 suns.

22. The concentrating solar energy system of claim 14 further comprising a transparent outer layer disposed in the opening.

23. The concentrating solar energy system of claim 22, wherein the transparent outer layer comprises at least one of glass and a transparent polymer.

24. The concentrating solar energy system of claim 22, wherein the aerogel layer is in direct contact with the transparent outer layer.

25. The concentrating solar energy system of claim 22, wherein the transparent outer layer and the aerogel layer define an air gap therebetween.

26. The concentrating solar energy system of claim 22, wherein the transparent outer layer forms at least a portion of a flat bottom surface of the opaque frame.

* * * * *